US010060795B2

United States Patent
Gunji et al.

(10) Patent No.: US 10,060,795 B2
(45) Date of Patent: Aug. 28, 2018

(54) MULTICHANNEL SPECTROPHOTOMETER AND DATA PROCESSING METHOD FOR MULTICHANNEL SPECTROPHOTOMETER

(71) Applicant: Shimadzu Corporation, Kyoto (JP)

(72) Inventors: Masahide Gunji, Kyoto (JP); Akira Noda, Nara (JP); Kensuke Otake, Kyoto (JP)

(73) Assignee: Shimadzu Corporation, Nishinokyo-Kuwabaracho, Nakagyo-ku, Kyoto-shi, Kyoto (JP)

( * ) Notice: Subject to any disclaimer, the term of this patent is extended or adjusted under 35 U.S.C. 154(b) by 0 days.

(21) Appl. No.: 15/550,006

(22) PCT Filed: Feb. 9, 2015

(86) PCT No.: PCT/JP2015/053513
§ 371 (c)(1),
(2) Date: Aug. 9, 2017

(87) PCT Pub. No.: WO2016/129033
PCT Pub. Date: Aug. 18, 2016

(65) Prior Publication Data
US 2018/0031423 A1 Feb. 1, 2018

(51) Int. Cl.
*G01J 3/28* (2006.01)
*G01J 3/36* (2006.01)
(Continued)

(52) U.S. Cl.
CPC . *G01J 3/36* (2013.01); *G01J 3/12* (2013.01); *G01J 3/2803* (2013.01); *G01J 3/42* (2013.01)

(58) Field of Classification Search
CPC ........ G01J 3/02; G01J 3/26; G01J 3/28; G01J 3/42; G01J 3/12; G01J 3/44; G01J 3/18; G01J 3/36
See application file for complete search history.

(56) References Cited

U.S. PATENT DOCUMENTS

2011/0255085 A1* 10/2011 Watanabe ................ G01J 3/02
356/317
2013/0155401 A1 6/2013 Muto

FOREIGN PATENT DOCUMENTS

JP H06-088782 3/1994
JP 2005-221336 8/2005
(Continued)

OTHER PUBLICATIONS

International Preliminary Report on Patentability Chapter 1 (dated Aug. 15, 2017) of PCT/JP2015/053513 and English Translation.
(Continued)

*Primary Examiner* — Abdullahi Nur
(74) *Attorney, Agent, or Firm* — Muir Patent Law, PLLC (57) ABSTRACT

A problem addressed by the present invention is to reduce the influence of stray light incident on each light-receiving element in the case of receiving each wavelength of light using a plurality of light-receiving elements. The multichannel spectrophotometer according to the present invention is a detector for simultaneously detecting the entirety of wavelength-dispersed light obtained by introducing light from a sample to a light-dispersing element (16) and dispersing this light into wavelengths by the light-dispersing element (16), including: a multichannel-type detector (17) including a plurality of light-receiving elements arranged in a one-dimensional form in a wavelength-dispersing direction of the light-dispersing element; a light amount calculator (221) for calculating the amount of light from a detection signal of each of the plurality of light-receiving elements (PD); a spectrum creator (222) for creating, from the amounts of light calculated by the light amount calculator (221), a spectrum showing a relationship between wavelength and the amount of light; and a computing section (224) for estimating, from the spectrum, the amount of stray light incident on each light-receiving element (PD) and correcting
(Continued)

the spectrum by subtracting, from the amount of wavelength-dispersed light incident on each light-receiving element, the amount of stray light.

8 Claims, 5 Drawing Sheets

(51) Int. Cl.
  *G01J 3/42* (2006.01)
  *G01J 3/12* (2006.01)

(56) References Cited

FOREIGN PATENT DOCUMENTS

| | | |
|---|---|---|
| JP | 2010-085327 | 4/2010 |
| JP | 2013-124990 | 6/2013 |
| WO | WO 2010-103807 A1 | 9/2010 |

OTHER PUBLICATIONS

Written Opinion of the International Search Authority (dated Aug. 16, 2016) of PCT/JP2015/053513 and English Translation.

International Search Report (dated Aug. 18, 2016) of PCT/JP2015/053513 of PCT/JP2015/053513 and English Translation.

Feinholz et al., "Stray Light Correction of the Marine Optical System." DOI: 10.1175/2008JTECHO597.1 2009 American Meteorological Society.

Chinese first Office Action dated Mar. 29, 2018 for corresponding Chinese Patent Application No. 201580075811.0 (English translation submitted is a machine translation).

Japanese Office Action dated May 29, 2018 for corresponding Japanese Patent Application No. 2016-574536 (English translation submitted is a machine translation).

* cited by examiner

MULTICHANNEL SPECTROPHOTOMETER AND DATA PROCESSING METHOD FOR MULTICHANNEL SPECTROPHOTOMETER

TECHNICAL FIELD

The present invention relates to a multichannel spectrophotometer in which a beam of light dispersed into wavelengths by a light-dispersing element is detected by a multichannel detector, such as a photodiode array detector or CCD linear image sensor, as well as a data processing method for such a spectrophotometer.

BACKGROUND ART

Figure 7:
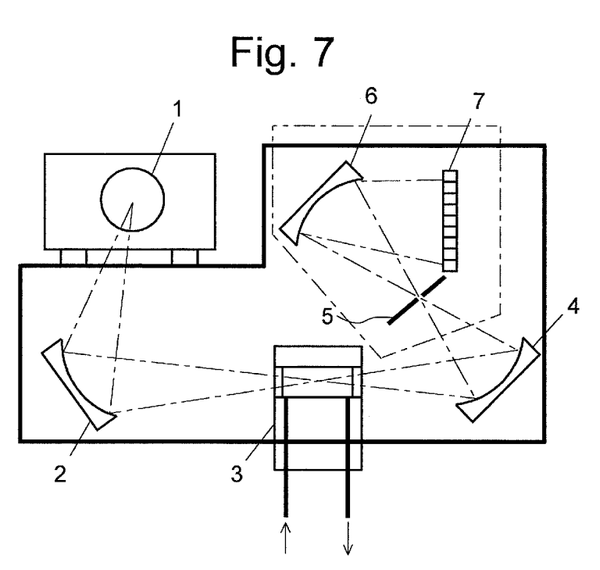
FIG. 7 is a configuration diagram of the main components of a conventional multichannel spectrophotometer.

A multichannel spectrophotometer is a device in which a beam of light emitted from a light source is cast into a sample to interact with this sample, the light resulting from the interaction (e.g. transmitted light or fluorescent emission) is dispersed into wavelengths by a light-dispersing element, and its intensity at each wavelength is detected. For example, such a device is used in a detection unit of a liquid chromatograph (see Patent Literature 1). FIG. 7 shows one example of the multichannel spectrophotometer used in the detection unit of a liquid chromatograph. A beam of light emitted from a light source 1 is focused by a concave mirror 2 and cast into a sample cell 3. A sample which has been temporally separated into components within a column (not shown) continuously flows into the sample cell 3 along with a mobile phase. After absorbing specific wavelengths of light, those components are discharged to a drain. The light transmitted through the sample cell 3 is reflected by a concave mirror 4. The reflected light passes through a slit 5 and is dispersed into wavelengths by a concave diffraction grating 6, to be eventually detected by a multichannel detector 7 (which is hereinafter called the "detector 7"), such as a photodiode array detector (PDA detector) or CCD linear image sensor.

The detector 7 includes a large number of micro-sized light-receiving elements arrayed in a one-dimensional form. When the light dispersed into wavelengths by the concave diffraction grating 6 falls onto the detector 7, the wavelength-dispersed light is simultaneously detected by the light-receiving elements and converted into electric signals corresponding to the intensity of light. Based on the detection signals from the detector 7, an absorption spectrum over a predetermined wavelength range can be created.

In the spectrophotometer having the previously described configuration, the light dispersed by the concave diffraction grating 6 is detected by the light-receiving elements each of which receives the light within a different wavelength range having the same wavelength width. The first and nth light-receiving elements located at both ends of the detector 7 are designed to respectively receive light at the uppermost and lowermost wavelengths $\lambda 1$ and $\lambda n$ of the measurable wavelength range of the spectrophotometer. With this design, the light intensity at each wavelength can be accurately detected, allowing for the identification of a sample component as well as the measurement of its concentration from the peak wavelength and peak intensity of the obtained absorption spectrum.

There should normally be a linearity between the magnitude of the peak intensity of the absorption spectrum obtained from the detection signals from the detector 7 and the concentration of the sample component. However, the light received by the light-receiving elements is not always limited to the light emitted from the sample and dispersed into wavelengths by the concave diffraction grating 6; for example, the reflection of light from various optical components in the spectrophotometer falls onto the light-receiving elements as stray light. In such a case, the amount of light received by each light-receiving element becomes greater than that of the light within the intended wavelength range. In particular, when the concentration of the sample component is high, the light within a specific wavelength range undergoes considerable absorption, causing an increase in the proportion of the amount of stray light to that of the light intended to be received, so that the influence of the stray light becomes noticeable. Accordingly, various methods for removing such an influence of the stray light on spectrometric analyses have been proposed.

For example, Patent Literature 1 discloses a method for computing a component concentration in a sample cell in a spectrophotometer, using a cell divided into a sample cell and a reference sample cell by a separator window. In this method, the absorbance of light is detected for both the sample cell and the reference sample cell while the separator window is gradually moved. The component concentration is determined from the displacement of the separator window, absorbance of the sample cell and that of the reference sample cell. This removes the influence of the stray light originating from such components of light as reflected by components on the cell surface, scattered by scratches or stains on the cell, or scattered by dust or suspended matter floating in the sample.

Patent Literature 2 discloses a method for removing the influence of a stray-light component in a scanning range sensor in which an emission of light from a light source is cast into a sample through a mirror or half mirror and an emission of light from the sample is directed through a mirror or half mirror into a photodetector, the stray-light component being such light as reflected or scattered on the surface of a window section for admitting the light from the light source into the sensor. According to Patent Literature 2, the incidence of the stray-light component on the photodetector is prevented by adjusting the orientation and other parameters of the mirrors and half mirrors so as to direct the stray-light component onto a light absorber placed within the sensor.

CITATION LIST

Patent Literature

Patent Literature 1: JP 6-88782 A
Patent Literature 2: JP 2005-221336 A

Non Patent Literature

Non Patent Literature 1: Michael E. Feinholz, et al. "Stray Light Correction of the Marine Optical System", Journal of Atmospheric and Oceanic Technology, January 2009, pp. 57-73

SUMMARY OF INVENTION

Technical Problem

In the previously described multichannel spectrophotometer, the light which has entered the device and passed through the sample cell 3 falls onto the concave diffraction grating 6 after passing through the slit 5. While the largest portion of the light which has fallen onto the concave diffraction grating 6 is dispersed into wavelengths by the concave diffraction grating 6 and falls onto the PDA detector 7, a portion of the light is scattered by dust or the like adhered to the surface of the concave diffraction grating 6 and eventually falls onto the light-receiving elements of the PDA detector 7 as stray light. The methods described in Patent Literatures 1 and 2 can reduce the amount of stray light incident on the concave diffraction grating 6 but cannot remove stray light which occurs on the surface of the concave diffraction grating 6.

Additionally, in a multichannel spectrophotometer which simultaneously detects the entirety of the wavelength-dispersed light by a plurality of light-receiving elements, a portion of the wavelength-dispersed light falling onto one light-receiving element may be reflected by the light-receiving plane of this light-receiving element and eventually detected by another light-receiving element. Such a portion of the wavelength-dispersed light which is detected by a light-receiving element different from the one intended to receive that portion of light is also a type of stray light. This type of stray light is not considered in conventional multichannel spectrophotometers.

The problem to be solved by the present invention is to provide a multichannel spectrophotometer capable of reducing the influence of various types of stray light falling onto each light-receiving element when simultaneously detecting the entirety of the wavelength-dispersed light by a plurality of light-receiving elements, as well as a data processing method for such a spectrophotometer.

Solution to Problem

The invention according to the first aspect of the present application developed for solving the previously described problem is a multichannel spectrophotometer for simultaneously detecting the entirety of wavelength-dispersed light obtained by introducing light from a sample to a light-dispersing element and dispersing this light into wavelengths by the light-dispersing element, the spectrophotometer including:

a) a multichannel-type detector including a plurality of light-receiving elements arranged in a one-dimensional form in a wavelength-dispersing direction of the light-dispersing element;

b) a light amount calculator for calculating the amount of light from a detection signal of each of the plurality of light-receiving elements;

c) a spectrum creator for creating, from the amounts of light calculated by the light amount calculator, a spectrum showing a relationship between the wavelength and the amount of light;

d) a stray-light amount estimator for estimating, from the spectrum, the amount of stray light incident on each light-receiving element; and e) a spectrum corrector for correcting the spectrum by subtracting, from the amount of wavelength-dispersed light incident on each light-receiving element, the estimated amount of stray light incident on that light-receiving element.

In the multichannel spectrophotometer according to the present invention, the plurality of light-receiving elements of the detector is arranged in a one-dimensional form in a wavelength-dispersing direction of the light-dispersing element so that each light-receiving element receives the wavelength-dispersed light within a different wavelength range having the same wavelength width. Each component of the wavelength-dispersed light from the light-dispersing element is received by one light-receiving element corresponding to the wavelength range of that component. The light-receiving element generates a detection signal corresponding to the amount of light received. A photodiode array detector (PDA detector), CCD linear image sensor or the like may be used as such a detector.

The light amount calculator computes the amount of light from the detection signal generated by each light-receiving element. The spectrum creator creates a spectrum showing a relationship between the wavelength and the amount of light from the computed amounts of light. In this process, the spectrum creator locates a wavelength for each amount of light based on the position of the light-receiving element which has generated the detection signal from which the amount of light concerned has been derived. In such a detector, if a light-receiving element intended to receive light within one wavelength range receives light belonging to another wavelength range, it is impossible to distinguish between the two kinds of light. Therefore, if a portion of the wavelength-dispersed light from the light-dispersing element enters a light-receiving element different from the intended one corresponding to the wavelength range including that portion of light, the amount of light detected by the intended light-receiving element becomes lower than the actual amount, while the amount of light detected by the other light-receiving element becomes higher than the actual amount.

If the wavelength-dispersed light within a predetermined wavelength range falls onto a light-receiving element different from the one intended to receive that wavelength range of light, this wavelength-dispersed light acts as stray light for the latter light-receiving element. Such a phenomenon is likely to occur among closely located light-receiving elements; a portion of the light falling onto one of the closely located light-receiving elements may possibly act as stray light for another one of the light-receiving elements, and vice versa. That is to say, the "intended" and "other" light-receiving elements are located close to each other, and the amounts of stray light incident on the "other" light-receiving elements depend on the amount of wavelength-dispersed light incident on the "intended" light-receiving element. The amount of wavelength-dispersed light incident on the "intended" light-receiving element can be determined from the spectrum showing a relationship between the amount of each component of the wavelength-dispersed light calculated from the detection signal of each of the plurality of light-receiving elements and the wavelength. Accordingly, the stray-light amount estimator in the present invention estimates the amount of stray light incident on each light-receiving element from the spectrum.

In the case where the detector includes a casing containing the plurality of light-receiving elements and a window section provided in the casing for admitting light from the light-dispersing element into the casing, each portion of the wavelength-dispersing light travelling from the light-dispersing element into the casing through the window section does not entirely fall onto the intended light-receiving element corresponding to the wavelength range of that portion of light, but partially becomes stray light incident on another light-receiving element different from the intended light-receiving element after being reflected one or more times between the light-receiving plane of the light-receiving elements and the window section. Such a phenomenon is not unique to the light dispersed into wavelengths by the light-dispersing element, but similarly occurs on the light which is scattered by dust or the like adhered to the surface of the light-dispersing element and falls onto the light-receiving elements inside the casing through the window section.

Accordingly, in the case where the multichannel spectrophotometer according to the present invention includes a detector having the previously described configuration, the stray-light amount estimator determines a stray-light model representing the amount of light which originates from the light-dispersing element, enters the casing through the window section, and is detected by the light-receiving elements as stray light after being reflected one or more times between a light-receiving plane of the light-receiving elements and the window section; and the stray-light amount estimator includes a storage section for holding the stray-light model and estimates, from this stray-light model and the spectrum, the amount of stray light incident on each light-receiving element.

The stray-light model may be expressed as a mathematical formula using such parameters as the wavelength and intensity of the light dispersed into wavelengths by the light-dispersing element, incident angle of the wavelength-dispersed light to the light-receiving plane of the light-receiving elements, reflectance of the light-receiving plane, as well as transmittance and reflectance of the window section. A table showing the amount of stray light detected by each light-receiving element in relation to the wavelength and intensity of the light dispersed into wavelengths by the light-dispersing element may also be used as the stray-light model.

Another example of the stray-light model is an approximate formula using, as parameters, the position of the light-receiving element on which stray light is incident and the proportion of the amount of stray light, the approximate formula created for a plurality of kinds of monochromatic light having different wavelengths by determining, for each of the plurality of kinds of monochromatic light, the position of the light-receiving element on which the monochromatic light is incident as stray light and the proportion of the amount of stray light incident on the light-receiving element to the total amount of the monochromatic light incident on the light-receiving elements, based on the detection signal obtained from each of the plurality of light-receiving elements when the monochromatic light is introduced to the light-dispersing element.

The stray-light model may also be an approximate formula using, as parameters, an estimated position of the light-receiving element on which stray light is incident and an estimated proportion of the amount of stray light to the total amount of light incident on the light-receiving elements, the approximate formula created by: creating an absorption spectrum showing a relationship between wavelength and absorbance based on signal values respectively obtained from the plurality of light-receiving elements when multi-wavelength light transmitted through a sample having an known absorption spectrum is introduced to the light-dispersing element; and estimating the position of the light-receiving element on which stray light is incident and the proportion of the amount of stray light, from the difference in shape between the created absorption spectrum and the known absorption spectrum.

Samples having different component concentrations normally produce absorption spectra in which the peak of interest is different in height yet identical in shape. However, if stray light is contained in the wavelength-dispersed light detected by a light-receiving element, the peak will be different in both height and shape. This tendency is particularly noticeable if the sample has a high component concentration and absorbs a considerable amount of light, since these conditions increase the proportion of the amount of stray light to that of the wavelength-dispersed light detected by the light-receiving element.

Accordingly, the stray-light model may also be an approximate formula using, as parameters, an estimated position of the light-receiving element on which stray light is incident and an estimated proportion of the amount of stray light to the total amount of light incident on the light-receiving elements, the approximate formula created by: creating, for each of a plurality of samples having different component concentrations, an absorption spectrum showing a relationship between wavelength and absorbance based on signal values respectively obtained from the plurality of light-receiving elements when multi-wavelength light transmitted through the sample concerned is introduced to the light-dispersing element; and estimating the position of the light-receiving element on which stray light is incident and the proportion of the amount of stray light, from the relationship of the shapes of the absorption spectra and the component concentrations.

The invention according to the second aspect of the present application is a data processing method for a multichannel spectrophotometer for detecting the amount of light dispersed into wavelengths by a light-dispersing element, using a plurality of light-receiving elements arranged in a one-dimensional form in a wavelength-dispersing direction of the light-dispersing element, the method including:

calculating the amount of light from a detection signal of each of the plurality of light-receiving elements, and creating a spectrum showing a relationship between the wavelength and the amount of light;

estimating, from the spectrum, the amount of stray light incident on each light-receiving element; and correcting the spectrum by subtracting, from the amount of wavelength-dispersed light incident on each light-receiving element, the estimated amount of stray light incident on that light-receiving element.

In the case where the multichannel spectrophotometer includes a multichannel-type detector having a casing containing the plurality of light-receiving elements and a window section provided in the casing for admitting light from the light-dispersing element into the casing, the present method may preferably include: determining a stray-light model expressed as a mathematical formula representing the amount of light which originates from the light-dispersing element, enters the casing through the window section, and is detected by the light-receiving elements as stray light after being reflected one or more times between a light-receiving plane of the light-receiving elements and the window section; and estimating, from this stray-light model and the spectrum, the amount of stray light incident on each light-receiving element.

Alternatively, the method may include:

determining, for each of a plurality of kinds of monochromatic light having different wavelengths, the position of the light-receiving element on which the monochromatic light is incident as stray light and the proportion of the amount of stray light incident on the light-receiving element to the total amount of the monochromatic light incident on the light-receiving elements, based on the detection signal obtained from each of the plurality of light-receiving elements when the monochromatic light is introduced to the light-dispersing element; and estimating, from the spectrum, the amount of stray light incident on each light-receiving element, based on the position of the light-receiving element on which the stray light is incident and the proportion of the amount of stray light, determined for the plurality of kinds of monochromatic light.

Alternatively, the method may include: creating an absorption spectrum showing a relationship between wavelength and absorbance based on signal values respectively obtained from the plurality of light-receiving elements when multi-wavelength light transmitted through a sample having a known absorption spectrum is introduced to the light-dispersing element; estimating the position of the light-receiving element on which stray light is incident and the proportion of the amount of stray light to the total amount of light incident on the light-receiving elements, from the difference in shape between the created absorption spectrum and the known absorption spectrum; and estimating, from the spectrum, the amount of stray light incident on each light-receiving element, based on the estimated position of the light-receiving element on which stray light is incident and the estimated proportion of the amount of stray light.

Alternatively the method may include: creating, for each of a plurality of samples having different component concentrations, an absorption spectrum showing a relationship between wavelength and absorbance based on signal values respectively obtained from the plurality of light-receiving elements when multi-wavelength light transmitted through the sample concerned is introduced to the light-dispersing element; estimating the position of the light-receiving element on which stray light is incident and the proportion of the amount of stray light to the total amount of light incident on the light-receiving elements, from the relationship of the shapes of the absorption spectra and the component concentrations; and estimating, from the spectrum, the amount of stray light incident on each light-receiving element, based on the estimated position of the light-receiving element on which stray light is incident and the estimated proportion of the amount of stray light.

Advantageous Effects of the Invention

According to the present invention, in the case where a beam of light dispersed into wavelengths by a light-dispersing element is detected by a plurality of light-receiving elements and a spectrum showing the relationship between the wavelength and the amount of light is obtained based on the detection result, the spectrum can be corrected by estimating, from the spectrum itself, the amount of various types of stray light, such as the scattered light occurring on the surface of the light-dispersing element or the stray light which occurs when a portion of the light dispersed into wavelengths by the light-dispersing element falls onto a light-receiving element different from the one intended to receive that portion of light. Therefore, the influence of the stray light on the spectrometric analysis can be reduced.

DESCRIPTION OF EMBODIMENTS

Figure 1:
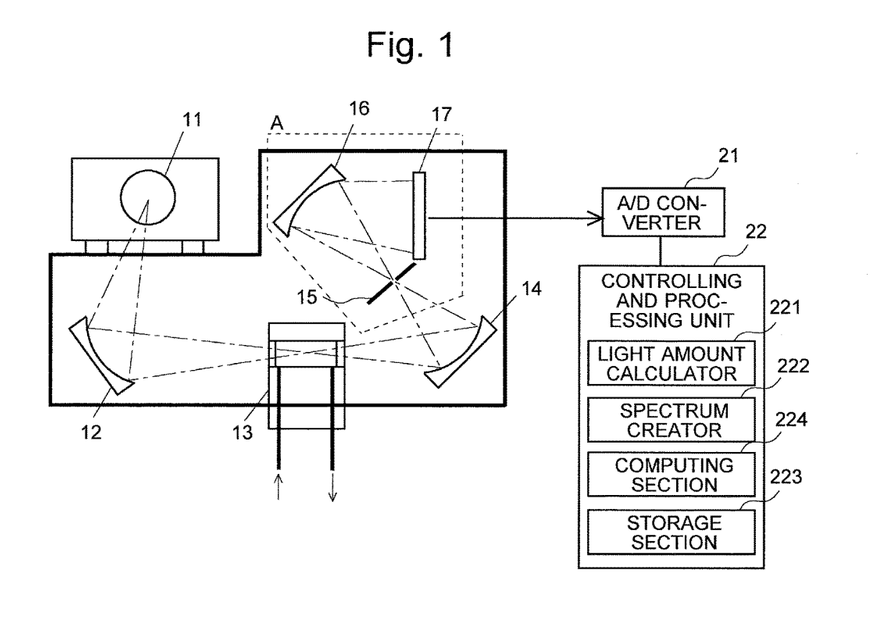
FIG. 1 is a configuration diagram of the main components of a multichannel spectrophotometer according to one embodiment of the present invention.
Figure 2:
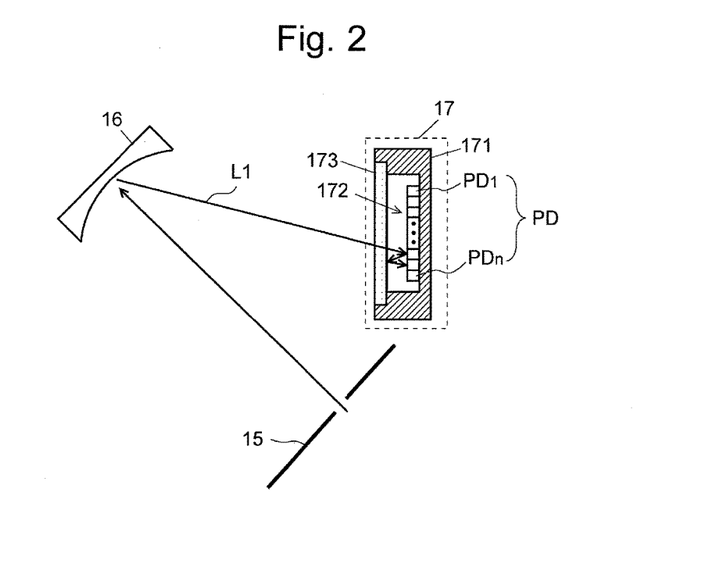
FIG. 2 is a diagram illustrating the path of a beam of light originating from a concave diffraction grating and falling onto light-receiving elements.

The spectrophotometer according to the present invention is hereinafter described using a specific embodiment. FIG. 1 is a configuration diagram of the main components of the spectrophotometer according to the present embodiment. FIG. 2 is an enlarged view of the portion surrounded by broken line A in FIG. 1. Components which have identical or corresponding counterparts already described in FIG. 7 are denoted by numerals whose last one digits are the same as those of the counterparts, and their descriptions will be appropriately omitted.

A major characteristic of the spectrophotometer according to the present embodiment exists in the method of processing signals from the photodiode array detector 17. That is to say, as shown in FIG. 1, the detection signals from the light-receiving elements forming the light-receiving element array 172 are fed to a controlling and processing unit 22 after being converted into digital signals through an analogue-to-digital converter 21. A light amount calculator 221 calculates the amount of light received by each light-receiving element based on the signals fed to the controlling and processing unit 22. The amounts of light calculated by the light amount calculator 221 are related to the corresponding wavelengths and stored in the light amount calculator 221. Based on the stored amounts of light, a spectrum creator 222 creates a spectrum showing the relationship between the wavelength and the amount of light.

In a storage section 223, a stray-light model representing the amount of stray light to be detected by each light-receiving element is stored. Descriptions of the stray-light model will be given later. Based on the spectrum created by the spectrum creator 222 and the stray-light model, a computing section 224 estimates the amount of stray light incident on each light-receiving element and corrects the spectrum. In the present embodiment, the computing section 224 functions as both the stray-light amount estimator and the spectrum corrector.

As shown in FIG. 2, the photodiode array detector 17 includes a light-receiving element array 172 contained in a casing 171 and a window plate 173 made of quartz closing the opening of the casing 171. The light dispersed into wavelengths by the concave diffraction grating 16 passes through the window plate 173 and falls onto the light-receiving plane of the light-receiving element array 172. The light-receiving element array 172 is composed of n light-receiving elements PD (PD1-PDn) arrayed in the wavelength-dispersing direction of the concave diffraction grating 16. The first light-receiving element PD1 receives light within a wavelength range centering on the shortest wavelength among the wavelengths of the light dispersed by the concave diffraction grating 16, while the nth light-receiving element PDn receives light within a wavelength range centering on the longest wavelength. The incident light have the same wavelength width on all light-receiving elements PD.

For example, as indicated by the arrow L1 in FIG. 2, a beam of light with a predetermined wavelength range among the light dispersed into wavelengths by the concave diffraction grating 16 is introduced through the window section 173 into the casing 171, to be incident on the light-receiving plane of the light-receiving element PD located at the position corresponding to the wavelength range concerned. A portion of the wavelength-dispersed light incident on the light-receiving plane of the light-receiving element PD is reflected by the same light-receiving plane and further reflected by the window plate 173, turning into stray light incident on and detected by a light-receiving element PD different from the intended light-receiving element PD.

The phenomenon that the light dispersed into wavelengths by the concave diffraction grating 16 partially becomes stray light incident on a light-receiving element PD different from the intended light-receiving element PD occurs not only when the light has been reflected one time on each of the light-receiving plane of the light-receiving elements PD and the window plate 173, but also when the light has been reflected two or more times.

The position of the light-receiving element PD on which the light dispersed into wavelengths by the concave diffraction grating 16 is incident as stray light, depends on the angle of incidence of the light from the concave diffraction grating 16 to the light-receiving plane of the light-receiving element array 172 through the window plate 173, distance between the window plate 173 and the light-receiving plane of the light-receiving element array 172, and other factors. The amount of stray light incident on each light-receiving element PD is depends on the amount of light from the concave diffraction grating 16, transmittance and reflectance of the window plate 173, reflectance of the light-receiving plane of the light-receiving element array 172 and other factors.

Figure 3A:
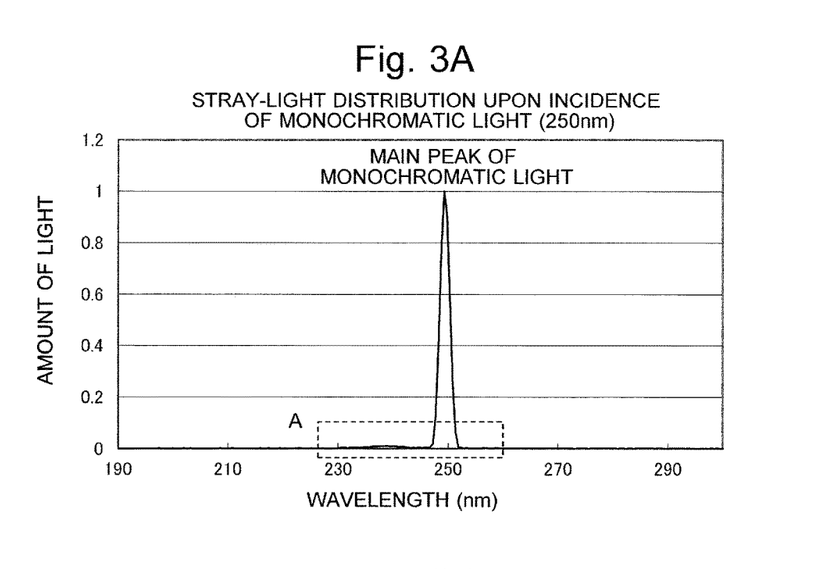
FIG. 3A is a graph showing the amount of light detected by the individual light-receiving elements when monochromatic light with a wavelength of 250 nm was incident on the light-receiving elements.
Figure 3B:
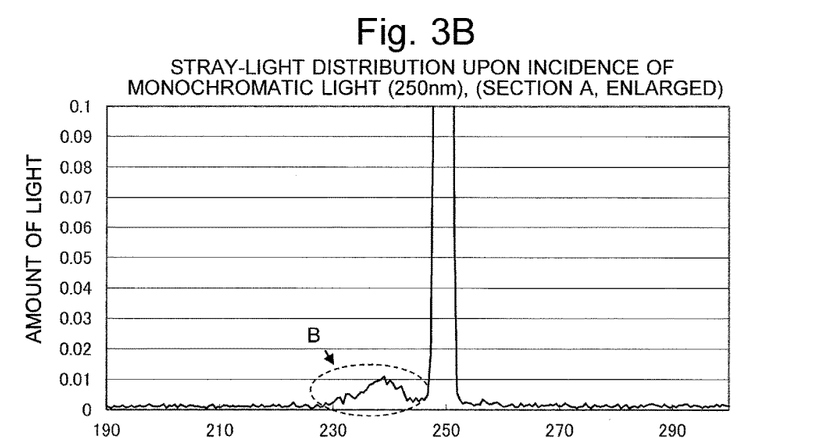
FIG. 3B is the same graph as FIG. 3A with the vertical axis enlarged.

For example, FIGS. 3A and 3B show detection results obtained with the light-receiving elements PD when a beam of light from a light source 11 generating monochromatic light at a wavelength of 250 nm was introduced through the concave mirror 12, sample cell 13, concave mirror 14 and slit 15 to the concave diffraction grating 16, with no sample contained in the sample cell 13. In FIGS. 3A and 3B, the vertical axis indicates the amount of light, while the horizontal axis indicates the central wavelength of the wavelength range of the wavelength-dispersed light which was intended to fall onto the light-receiving element PD at which that amount of light was detected. FIG. 3B is the same graph as FIG. 3A with the vertical axis enlarged where the peaks in the section A surrounded by the broken line in FIG. 3A are shown in more recognizable manner. Introducing the 250-nm monochromatic light to the concave diffraction grating 16 should normally result in an output of the detection signal from the light-receiving element PD having a central wavelength of 250 nm. Accordingly, the amount of light for this monochromatic light should exclusively appear at "250 nm" on the horizontal axis. However, as shown in FIGS. 3A and 3B, the actual light is also distributed at wavelengths other than 250 nm (the low peaks present within the circular area B surrounded by the broken line in FIG. 3B).

The amounts of light represented by such peaks correspond to the amounts of stray light falling onto light-receiving elements PD different from the intended light-receiving element PD due to the unwanted reflections by the light-receiving plane of the light-receiving elements PD and the window plate 173. In the following description, the distribution of the amount of light within the circular area B is called the "stray-light spectrum". In the present embodiment, such stray-light spectra were initially measured for various wavelengths of monochromatic light, and the following items of information (A)-(C) were determined from the measured result. Subsequently, a stray-light model representing the stray-light distribution by a mathematical formula (stray-light distribution matrix) was created from those items of information (A)-(C).

(A) relationship between the wavelength of the incident light from the concave diffraction grating 16 and the occurrence position of the stray light;

(B) proportion of the amount of stray light to the amount of incident light from the concave diffraction grating 16; and (C) form of the spread of the stray light in relation to the wavelength of the incident light from the concave diffraction grating 16, where the wavelength of the incident light is the wavelength of the monochromatic light. The amount of incident light can be determined from the detection signal of the light-receiving element whose central wavelength corresponds to that of the monochromatic light. The occurrence position of the stray light, amount of stray light, and form of the spread of the stray light can be determined from the position of each light-receiving element PD at which the stray light was detected and the thereby generated detection signal, i.e. from the stray-light spectrum.

For example, the following equation (1) is an equation showing the relationship of three kinds of spectra: a measured spectrum Ymeas, spectrum Y free of stray light, and stray-light spectrum Ysl. The stray-light spectrum Ysl is obtained by multiplying the spectrum Y free of stray light by stray-light distribution matrix D.

$$Y\text{meas}=Y+Ysl=Y+D\cdot Y=[I+D]\cdot Y \quad (1)$$

The term "I" in this equation represents the unit matrix. The stray-light distribution matrix D, which is expressed as follows, is one example of the stray-light model created from the aforementioned items of information (A)-(C):

$$D = \begin{bmatrix} d_{1,1} & \Lambda & d_{1,j} & \Lambda & d_{1,n} \\ M & M & M & M & M \\ d_{i,1} & \Lambda & d_{i,j} & \Lambda & d_{i,n} \\ M & M & M & M & M \\ d_{n,1} & \Lambda & d_{n,j} & \Lambda & d_{n,n} \end{bmatrix}$$

In this matrix D, "M" and "Λ" indicate that there are one or more rows or columns included in those sections.

Figure 4:
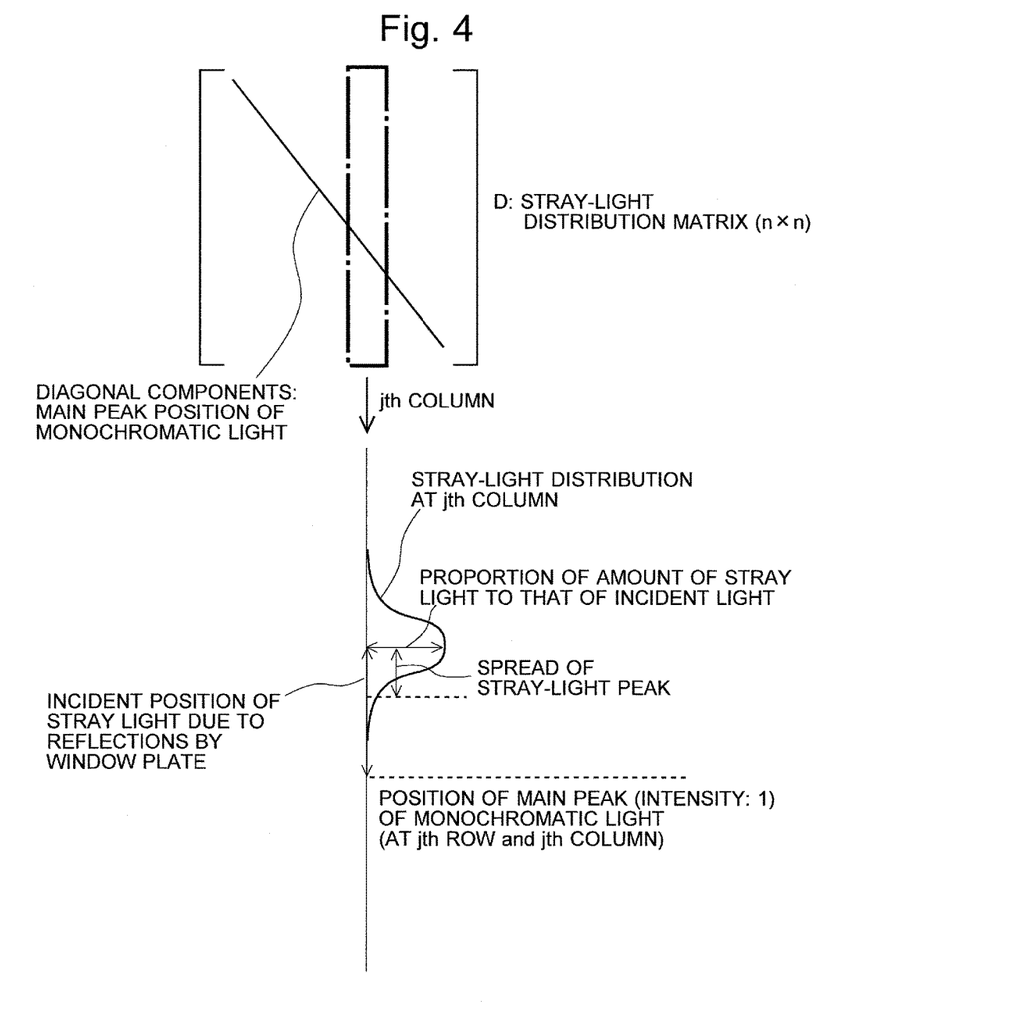
FIG. 4 is a diagram illustrating an approximate formula representing a stray-light model.

As shown in FIG. 4, the jth column (d1,j, . . . , di,j, . . . , dn,j) of the stray-light distribution matrix D represents the stray-light distribution observed when monochromatic light with wavelength λj, which corresponds to the jth light-receiving element PDj in the light-receiving element array 172, is cast into the sample cell 13. The value of "di,j" indicates the magnitude of the amount of light detected with the light-receiving element PDj intended to receive the monochromatic light with wavelength λj; the other values indicate the magnitudes of the amounts of light detected as stray light. The amount of stray light at each light-receiving element is expressed as a proportion under the condition that the amount of monochromatic light incident on the concave diffraction grating 16 is defined as one.

From the matrix equation (1), the spectrum with the corrected amounts of stray light can be determined from the following equation:

$$Y\text{meas}=[I+D]\cdot Y \quad (2)$$

by solving equation (2) for Y as follows:

$$Y=[I+D]^{-1}\cdot Y\text{meas} \quad (3)$$

In the multichannel spectrophotometer according to the present embodiment, the stray-light distribution matrix D and the aforementioned equation (3) are stored in the storage section 223. The computing section 224 calculates a corrected spectrum from the spectrum created by the spectrum creator 222, using the stray-light distribution matrix and equation (3).

Figure 5:
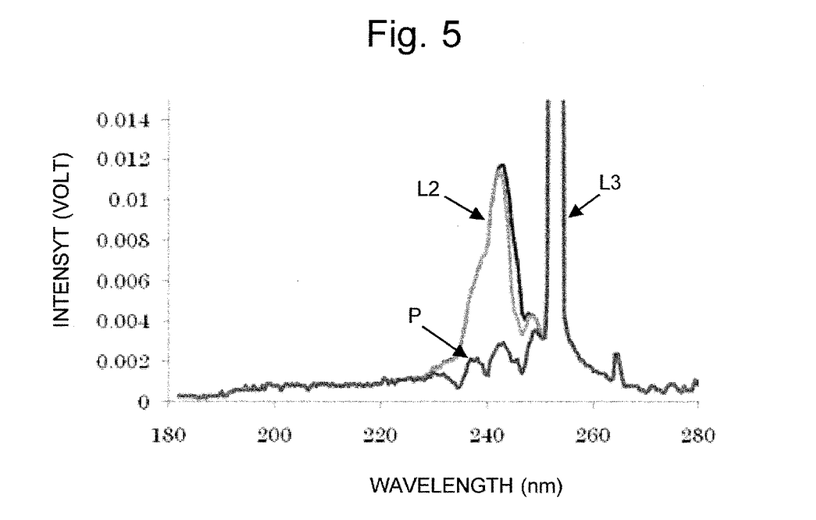
FIG. 5 is a graph showing the result of a stray-light correction performed using a bright line at a wavelength of 254 nm.
Figure 6:
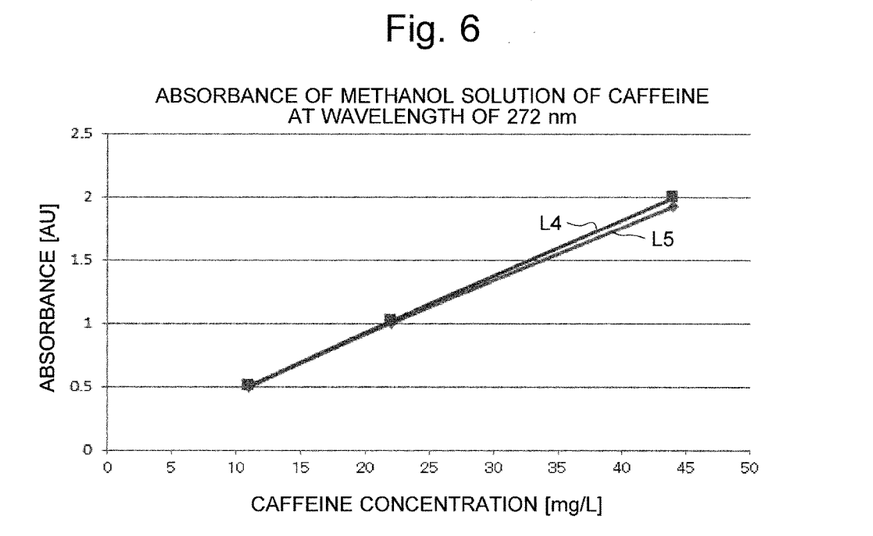
FIG. 6 is a graph showing the result of a stray-light correction by the method according to the present embodiment and that obtained by a conventional method.

FIGS. 5 and 6 show the results of stray-light corrections actually performed using equation (3).

FIG. 5 shows the result of a stray-light correction using a bright line at a wavelength of 254 nm emitted from a mercury lamp. Solid line L2 represents the spectrum before the correction, while solid line L3 represents the corrected one. As can be seen in FIG. 5, the 254-nm peak before the correction was accompanied by another peak around a wavelength of 240 nm. The magnitude of this peak was reduced by the correction (as indicated by arrow P).

FIG. 6 shows a component concentration in a sample determined from a spectrum corrected by the method of the present embodiment as well as the component concentration in the sample determined with no correction of the spectrum (conventional method). In the figure, solid line L4 represents the result obtained in the present embodiment, while solid line L5 represents the result obtained by the conventional method. A methanol solution of caffeine was used as the sample. The caffeine concentration was set at three values: 11 mg/L, 22 mg/L and 44 mg/L. Under ideal conditions, the absorbance of light at a wavelength of 272 nm for these concentrations will be 0.5 AU, 1 AU and 2 AU, respectively.

For the samples with caffeine concentrations of 11 mg/L and 22 mg/L, the absorbance was 0.5 AU and 1.0 AU, respectively, in both of the conventional and present methods. For the sample with a concentration of 44 mg/L, the absorbance determined by the correction method of the present embodiment was 2.0 AU, while the one determined by the conventional method was 1.9 AU. These results confirm that, by the present embodiment, the concentration can be correctly determined even within a range where the absorbance is high due to a high component concentration.

The present invention is not limited to the previously described embodiment.

For example, as opposed to the previous embodiment in which the matrix equation is used as the stray-light model, stray-light spectra determined for various wavelengths of monochromatic light may be stored in the storage section 223 and the spectrum correction may be performed by subtracting one of those stray-light spectra from the spectrum in question. It is also possible to determine the aforementioned items of information (A)-(C) from the stray-light spectra and create, as the stray-light model, an approximate formula using those items of information as parameters.

It is also possible to create an absorption spectrum showing a relationship between wavelength and absorbance based on signal values respectively obtained from the plurality of light-receiving elements when multi-wavelength light transmitted through a sample having a known absorption spectrum is introduced to the light-dispersing element, then determine the aforementioned items of information (A)-(C) from the difference in shape between the created absorption spectrum and the known absorption spectrum, and create, as the stray-light model, an approximate formula using those items of information (A)-(C) as parameters.

It is also possible to create, for each of a plurality of samples having different component concentrations, an absorption spectrum showing a relationship between wavelength and absorbance based on signal values respectively obtained from the plurality of light-receiving elements when multi-wavelength light transmitted through the sample concerned is introduced to the light-dispersing element, then determine the aforementioned items of information (A)-(C) from the relationship of the shapes of the absorption spectra and the component concentrations, and create, as the stray-light model, an approximate formula using those items of information (A)-(C) as parameters.

REFERENCE SIGNS LIST 1, 11 . . . Light Source
2, 12 . . . Concave Mirror
3, 13 . . . Sample Cell
4, 14 . . . Concave Mirror
5, 15 . . . Slit
6, 16 . . . Concave Diffraction Grating
7 . . . Multichannel Detector
17 . . . Photodiode Array Detector
172 . . . Light-Receiving Element Array
173 . . . Window Plate
PD . . . Light-Receiving Element

The invention claimed is:

1. A multichannel spectrophotometer for simultaneously detecting an entirety of wavelength-dispersed light obtained by introducing light from a sample to a light-dispersing element and dispersing this light into wavelengths by the light-dispersing element, comprising:
   a) a multichannel-type detector including a plurality of light-receiving elements arranged in a one-dimensional form in a wavelength-dispersing direction of the light-dispersing element;
   b) a light amount calculator for calculating an amount of light from a detection signal of each of the plurality of light-receiving elements;
   c) a spectrum creator for creating, from the amounts of light calculated by the light amount calculator, a spectrum showing a relationship between wavelength and the amount of light;
   d) a stray-light spectrum creator for creating, for each of a plurality of different wavelengths, a stray-light spectrum showing a relationship between a position of the light-receiving element on which the monochromatic light at the wavelength concerned is incident as stray light and an amount of stray light incident on the same light-receiving element, from the detection signals respectively obtained from the plurality of light-receiving elements when monochromatic light having the wavelength concerned is introduced to the light-dispersing element; and
   e) a spectrum corrector for correcting a sample spectrum created by the spectrum creator when the light from the sample is introduced to the light-dispersing element, based on the stray-light spectra respectively created for the different wavelengths.

2. The multichannel spectrophotometer according to claim 1, wherein:
   the spectrum corrector includes a stray-light model creator for creating a stray-light model representing a distribution of the stray light by a mathematical formula based on the stray-light spectrum, and corrects the sample spectrum using the stray-light model.

3. The multichannel spectrophotometer according to claim 2, wherein:
the stray-light model is a matrix formula using, as parameters, positions of the plurality of light-receiving elements and the amount of stray light at each wavelength incident on each light-receiving element.

4. The multichannel spectrophotometer according to claim 2, wherein:
the stray-light model is an approximate formula using, as parameters, the wavelength and a proportion of the amount of monochromatic light at that wavelength incident on any of the plurality of light-receiving elements as stray light to a total amount of the monochromatic light at the wavelength concerned.

5. A data processing method for a multichannel spectrophotometer for detecting an amount of light dispersed into wavelengths by a light-dispersing element, using a plurality of light-receiving elements arranged in a one-dimensional form, comprising:
introducing each of a plurality of kinds of monochromatic light having different wavelengths to the light-dispersing element, and creating, for each of the different wavelengths, a stray-light spectrum showing a relationship between positions of the light-receiving elements and an amount of stray light, from the detection signals respectively obtained from the plurality of light-receiving elements when monochromatic light having the wavelength concerned is introduced to the light-dispersing element;
introducing the light from the sample to the light-dispersing element, calculating an amount of each component of the wavelength-dispersed light from a detection signal of each of the plurality of light-receiving elements when the light from the sample is introduced to the light-dispersing element, and creating a sample spectrum showing a relationship between wavelength and the amount of light;
and
correcting the sample spectrum using the stray-light spectra respectively created for the different wavelengths.

6. The data processing method for a multichannel spectrophotometer according to claim 5, further comprising:
creating a stray-light model representing a distribution of the stray light by a mathematical formula based on the stray-light spectrum, and correcting the sample spectrum using the stray-light model.

7. The data processing method for a multichannel spectrophotometer according to claim 6, wherein:
the stray-light model is a matrix formula using, as parameters, the positions of the plurality of light-receiving elements and the amount of stray light at each wavelength incident on each light-receiving element.

8. The data processing method for a multichannel spectrophotometer according to claim 6, wherein:
the stray-light model is an approximate formula using, as parameters, the wavelength and a proportion of the amount of monochromatic light at that wavelength incident on any of the plurality of light-receiving elements as stray light to a total amount of the monochromatic light at the wavelength concerned.

* * * * *